INVENTOR
FRANCIS H. HERRON
BY Emil J. Bednar
ATTORNEY

United States Patent Office 3,714,012
Patented Jan. 30, 1973

3,714,012
CORROSION TEST PROBE ASSEMBLY
Francis H. Herron, deceased, by Rosa C. Herron, executrix, Houston, Tex., assignor to Petrolite Corporation, St. Louis, Mo.
Filed Nov. 18, 1971, Ser. No. 200,083
Int. Cl. G01n 27/30
U.S. Cl. 204—195 C
10 Claims

ABSTRACT OF THE DISCLOSURE

A corrosion test proble assembly formed of a pipe-plug base, a cylindrical insulator member and metallic electrodes. The rigid insulator member is slideably positioned in a cylindrical passageway and secured in longitudinal inward engagement with a shoulder in the body. Electrical conductors are secured in the member and extend from one end into a cavity in the body to connect by flexible leads to an external circuit connector and from the other end to receive, by threaded interconnection, metallic electrodes which can be immersed within a corrodant. A resilient annular seal resides in a circumferential groove in the member and forms a fluid-tight seal between the member and the body. Insulating fluid seals about the conductors are engaged axially in fluid-tightness between the member and the electrodes. The probe assembly is fabricated with easily interfitting parts and may be field-repaired to correct defects in the resilient seal or replacement of the insulator member.

BACKGROUND OF THE INVENTION

(1) Field of the invention

This invention relates to measuring and testing of corrosion processes, and it relates more particularly to the instruments and electrochemical techniques used in the study of corrosion processes.

(2) Description of the prior art

It is often desirable to determine the rates at which metals corrode within a corrosive liquid. For example, corrosion inhibitors are added to aqueous liquids to reduce the corrosion of exposed metals. Instruments are used to measure the rates at which these metals corrode so that the effectiveness of the inhibitor can be determined. The measurement of the rate of corrosion upon metals usually involves an instrument associated with a probe formed of an assembly of a base which carries a plurality of electrodes immersed within the corrosive liquid. In refineries, petrochemical plants, and other process industries using large volumes of aqueous fluids, the probes are usually installed within the piping system carrying the fluid desired to be monitored. Additionally, probes have been placed in other uses, such as in monitoring the rate of corrosion of metals forming oil field pipelines containing waters that are employed to stimulate oil production from subterranean reservoirs.

The probes must be readily interconnected into the piping system carrying aqueous fluids so that their electrodes are exposed to the corrodant. Whatever the construction of the probes, their placement into the piping must not create a weakness. For example, probes using plastics should be used only in environments where there is insignificant chemical and physical attack upon the particular plastics. The probe must be structurally sound irrespective of operating conditions. A failure of the probe by leakage or blow-out, can cause a severe economic loss when the piping system provides an essential processing link. Under these circumstances, the entire process could be temporarily interrupted while the probe is being replaced.

In many instances, the probe will be installed within a bypass piping circuit and it can be readily removed for inspection, replacement or repair. This arrangement also permits the advantageous field replacement of electrodes. The probes' electrodes can be replaced to eliminate effects of previous corrosion or exposure to inhibitors or to substitute electrodes constructed of different metals or sizes. Additionally, the electrodes may be examined to measure the actual weight loss suffered during exposure to the corrodant. The electrodes will be changed in the field, and usually by non-technical personnel. Therefore, the changing of the electrodes cannot require sophisticated measurement or replacement techniques. For example, the exposed surface areas of the electrodes carried on the probe's base cannot depend upon making certain measured engagements relative to a mounting or sealing surface.

The probe may be injured mechanically by cleaning of the piping system with "pigs," reamers or other types of scrapers. The probe can suffer breakage of rigid insulation or mechanical interconnection elements which mount the electrodes. Unless these defects are field repairable, the entire probe must be replaced.

In addition, the probe assembly of base and electrodes must not require special handling, placement or tools not normally available in the maintaining of the piping system in refineries, chemical plants and like installations. Preferably, the probe assembly looks and is handled like a regular pipe fitting. The probe assembly should not contain any materials (other than possibly the electrodes) which are more corrodible in the aqueous fluid than the piping system. Thus, the probe cannot be the weakest link in the piping system.

The probe assembly of the present invention is especially suited for use in accordance with the "Method and Apparatus for Determining Corrosion Rate" disclosed in U.S. Pat. 3,406,101. This patent describes a technique wherein is employed a corrosion ratemeter that includes a probe having three electrodes adapted to be exposed to a corrosive liquid, an adjustable current source, an ammeter and a high impedance voltmeter as primary components. The adjustable current scource applies a small electric current between a "test" electrode and an "auxiliary" electrode. At the same time, the voltmeter monitors the polarization potential between the "test" electrode and a "reference" electrode. The current flow slightly polarizes the surface of the "test" electrode, and as a result, causes a shift in the potential between the "test" and "reference" electrodes. The current flow required to produce 10 millivolts polarization is directly proportional to the corrosion rate of the "test" electrode undergoing corrosion.

In this technique, appropriate constants and adjustments of exposed surface area of the "test" electrode can be used so that the ammeter is calibrated directly in the desired units of corrosion rate providing the surface area of the "test" electrode remains constant in exposed surface. Thus, the probe must be arranged so that all the "test" electrodes, when exposed to corrosion, maintain a substantially constant exposed surface area.

Although the electrodes can be manufactured with certain identical exposed surface areas, the corrodant causes their exposed surfaces to become pitted and otherwise damaged. Eventually, the probe must be either discarded, or the electrochemical technique recalibrated for the new characteristic which the electrodes have assumed. Usually the latter occurrence is avoided by substituting a new probe assembly, or by replacing the electrodes on the existing probe assembly.

It is the purpose of this invention to provide a corrosion test probe assembly of a base and electrodes which can be readily installed in a piping system without introducing a weakness thereto or one requiring special piping techniques. Additionally, the electrodes can be readily replaced by non-technical personnel on the probe, and repairs made to the elements of the probe, without requiring special tools or recalibration of the corrosion measurement technique. The corrosion test probe assembly can be readily manufactured since it is assembled from selected components without requiring precise manual interfitting techniques.

SUMMARY OF THE INVENTION

In accordance with this invention, there is provided a corrosion test probe assembly suitable for determining the rate of corrosion of a metallic material in a corrodant by means of polarization measurements. A metallic body is provided at its bottom portion with an axial passageway having a cylindrical sidewall and an abutment shoulder adjacent to the passageway. A rigid insulator member with a cylindrical exterior surface is slideably positioned in the passageway and engages the abutting shoulder so that axial movement of the member within the body is restrained. A resilient annular seal is mounted in a circumferential groove about the member. The seal is placed into initial sealing engagement when the member is positioned in the body and joins the member and body into a fluidtight relationship. Locking means releasably secure the member within the body. A plurality of metallic electrical conductors are integrally carried in the member in electrical isolation and extend from both of its ends. A plurality of metallic electrodes are secured at a terminal pin end of these conductors whose other ends connect by flexible leads to an external circuit connector at the top portion of the body. The flexible leads reside in a cavity in the body between the member and connector. Insulating fluid seals surround the terminal pins and are engaged axially in fluid tightness between presented sealing surfaces associated with the member and the electrodes. The circuit connector provides testing circuits with the conductors through the electrodes during polarization measurements.

DESCRIPTION OF SPECIFIC EMBODIMENTS

Figure 1:
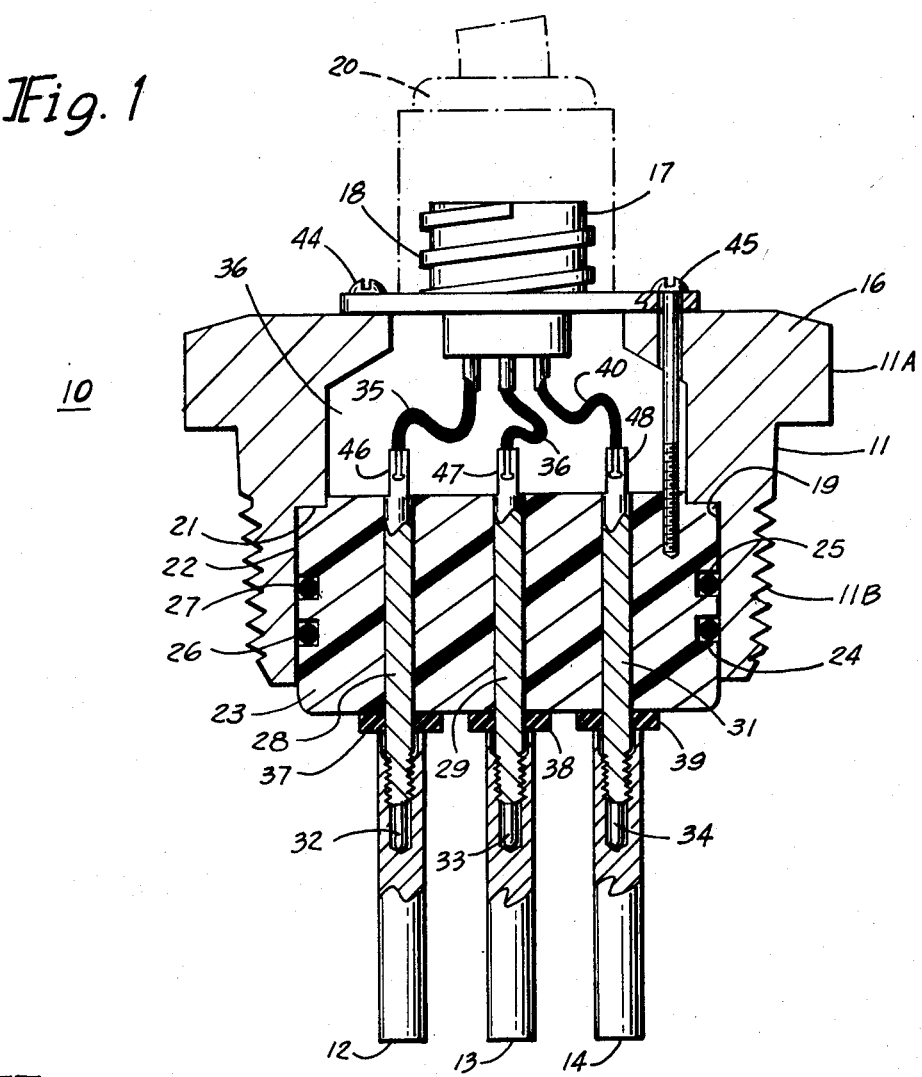
FIG. 1 is a vertical section of the probe assembly of this invention.

In FIG. 1, there is illustrated one embodiment of a corrosion test probe assembly 10 which can be secured within a piping system carrying a corrodant whose effect upon metallic substances is to be determined.

The probe assembly 10 is comprised of a base 11 upon which are carried two or more electrodes 12, 13 and 14. Electrical connection of the probe assembly 10 to an external corrosion ratemeter (not shown) can be effected by an electrical connector 17 carried atop the base 11. The electrodes are connected by insulated electrically conductive means within the base 11 to the connector 17. Thus, a corrosion ratemeter is readily connected to the probe assembly 10 and electrical circuits are provided to the electrodes 12, 13 and 14 during polarization measurements. The probe assembly 10 can be constructed of any suitable physical form so that it can be readily secured to the piping system carrying the corrodant to be monitored. Preferably, probe assembly 10 is constructed in the form of a pipe plug compatible with the piping system. Thus, the top portion 11A and the base 11 can have a polygonal configuration and the bottom portion 11B can be formed with a threaded exterior side surface.

The electrodes 12, 13 and 14 may extend longitudinally from the bottom of the base 11 in any side-by-side relationship. However, it is preferred to mount the electrodes in alignment and oriented in a plane transverse to the flow of the corrodant to be monitored.

The base 11 includes a rigid metallic body 16. The body 16 is provided with an axial passageway 19 having a cylindrical sidewall. The body 16 also carries an abutment shoulder 21 adjacent the passageway 19. An external circuit connector 17 with external threads 18 is carried at the top portion of the body 16. Electrical connection to a corrosion ratemeter (not shown) is by a cable connector 20.

A rigid insulator member 23 with a cylindrical sidewall 22 resides within the passageway 19 and engages the shoulder 21. As a result, axial movement of the member 23 is restrained against undesired displacement into the body 16. The member 23 carries at least one circumferential groove 24, and preferably a second groove 25 in which are mounted annular resilient seals 26 and 27. The annular seals 26 and 27 may be of any design for joining the body 16 and member 23 into a fluid tight relationship. However, the cylindrical meeting surfaces 19 and 22 should be relatively smooth to allow the member 23 to be slideably positioned in the body 16 without appreciable sideway movements. The annular seals 26 and 27 are placed into initial sealing engagement when the member 23 is installed within the body 16. Preferably, the seals 26 and 27 are pressure actuated, and O-rings are especially useful in probe assembly 10. Fluid pressure exerted on the lower portion of the probe assembly 10 forces the member 23 against the shoulder 21 and the seals 26 and 27 prevent any fluid leakage between the body 16 and member 23. The abutment should 22 may be placed at a different location on the body 16 and the member 23 adapted to operatively engage the shoulder 21. Preferably, the passageway 19 and the member 23 have complementary cylindrical surfaces so that the member 23 may be received into the body 11 with a relatively tight fit of only a few thousands of an inch in clearance.

The insulator 23 may be formed of any suitable material which is structurally rigid and has a high electrical resistivity. The insulator 23 integrally carries electrical conductors embedded therein and in electrical isolation from one another. The member 23 may be formed of a variety of substances such as hard rubber, various synthetic polymeric materials, laminated phenol materials, plastics, etc. However, it is preferred that the member 23 be formed of a blend of epoxy polymeric resins that may be cast or potted to close tolerances. This material is commonly called "Potting Resin" and is available commercially under the trade name Ring 251. Blended epoxy resins are ideally suited for the member 23 since they provide exceptional electrical insulative properties, high physical strength, and chemical attack resistance while maintaining good dielectric properties to insulate the conductors integrally carried in the member 23.

Metallic conductors 28, 29 and 31 are integrally carried in the member 23 in electrical isolation from one another. These conductors extend from one end of the member 23 remote from the connector 17 to form terminal pins 32, 33 and 34. These terminal pins are adapted, such as by threads, to receive the electrodes 12, 13 and 14. Preferably, the metallic conductors are formed by metal rods which are integrally carried in the member 23. The conductors also extend at their other ends from the member 23 into a cavity 36 formed in the body 16 between the connector 17 and member 23. Flexible electrical leads 35, 36 and 40 electrically connect the conductors to the downwardly extending terminals carried by connector 17. Preferably, the flexible leads have a sufficient length to permit connection between the conductors and connector before the member 23 is inserted into the body 16. The flexible leads are preferably secured to the conductors by direct mechanical interconnection. For example, screw terminals may be used. However, crimp-type connections are advantageous since they can be fabricated in field installations with simple tools so as to avoid the heating and electrical requirements of soldering. Thus, the member 23, if damaged or for other reasons, is pulled from the body 16 to expose the flexible leads which are disconnected. These leads are connected to conductors in the replacement member 23 which is then slideably positioned in the body 16.

It will be noted that the electrodes 12, 13 and 14 are threaded upon the terminal pins 32, 33 and 34 for ready installation and replacement as desired. It is essential that the surface areas of the electrodes exposed to the corrodant be maintained constant. Thus, it is necessary to isolate fluid-wise the terminal pins from the electrodes and any other metallic material which is in electrical communication with these electrodes. Cylindrical washers of an electrically non-conductive resilient material may provide insulating fluid seals encircling the terminal pins and engaged axially in fluid tightness to the presented sealing surfaces on the ends of the electrodes. For example, washers 37, 38 and 39 formed of resilient material, such as Neoprene, are mounted about the terminal pins. Thus, the exterior surface areas of the electrodes exposed to the corrodant are strictly controlled. In this regard, the resilient washers prevent fluid leakage between the member 23 and the electrodes 12, 13 and 14.

Figure 2:
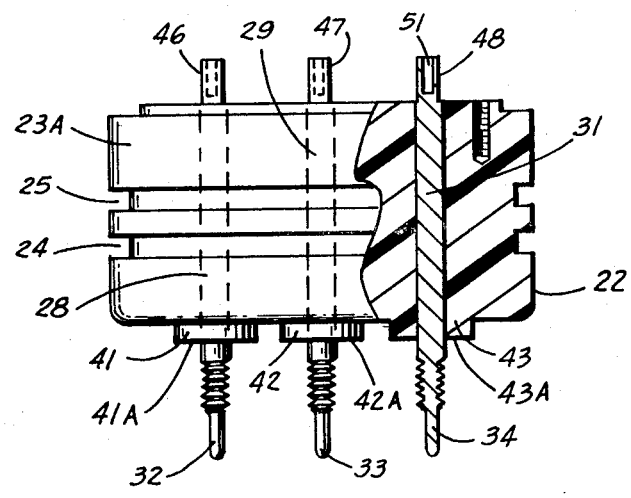
FIG. 2 is a prospective view, partially in vertical section of an alternative insulator member for the probe assembly shown in FIG. 1.

One alternative embodiment of the insulator member of the probe assembly 10 is shown in FIG. 2. The member 23a is formed with reduced diameter, cylindrical raised surfaces 41 42 and 43 surrounding the terminal pins at their base. Thus, annular spaces 41a, 42a and 43a are provided between the meeting surfaces of the member 23 and the end surfaces of the electrodes carried on the body 16. Resilient seals as in FIG. 1, can be mounted about the terminal pins and against the annular spaces to provide an improved (pressure actuated) fluid seal between the meeting surfaces of the member 23 and the electrodes The remaining elements of the member 12a are identical to FIG. 1, and like numerals are used to identify like parts.

If desired, the member 23a may have the terminal pins 32, 33 and 34 of a different alignment, or different thread sizes, or other construction for variant purposes than in the member 23. In the present probe assembly 10, the members 23 and 23a can be readily interchanged, or one member substituted for another member should the terminal pins be damaged, or for other reasons.

The insulator members are releasably secured with the body 16 by any suitable mechanism. For example, mounting screws 44 and 45 pass through the connector 17 and the top portion of the base 11, and these screws threadedly engage the member 23 below the cavity 36. In this arrangement screws 44 and 45 are removed. Then, the member 23 can be slideably removed from the body 16 to expose the flexible leads at their connections to the conductors 28, 29 and 31. The conductors are severed, or otherwise disconnected from the member 23.

The member 23a, with O-rings mounted in grooves 24 and 25 may be given a light coating of lubricant on its sidewall surface 22. The ends of the flexible leads are secured to the ends 46, 47 and 48 of the conductors 28, 29 and 31. Preferably, this connection is effected mechanically to avoid field problems associated with soldering. For this purpose, an axial opening 51 may be provided into the conductors at the upper exposed ends 46, 47 and 48. Where the flexible leads are insulated, a short segment of these leads is stripped to expose the metallic lead. This lead segment is inserted into the axial opening 51, now the top portion of each conductor is crimped to form the electrical interconnection between the flexible leads and conductors. The member 23a is aligned to receive the screws 44 and 45, inserted into the body 16, and secured in place against undesired displacement. If desired, a small amount of sealant may be placed on the member 23a to seal the area of the abutment shoulder 21. The flexible leads are "nested" within the cavity 36 and in this position they are protected from hazardous environments. The structural arrangement of the probe assembly 10 permits its manufacture in any desired sizes and configurations without effecting the ready replacement of the member 23 within the body 16.

Although the probe assembly 10 has been described as being formed essentially of a base 11 and a plurality of electrodes 12, 13 and 14, it will be apparent that the base 11 may be used with a variety of electrodes and members 23. For example, the electrodes may be formed of various like or different metals and may have different exterior sizes and thread selections where the corrosion test is so adapted. Although the base 11 may be used with a variety of electrodes, it has good utility when employed with dimensionally identical electrodes, such as illustrated in FIG. 1. For this purposes, the electrodes are counterbored at one end and carry internal threads which are adapted to be threadedly engaged upon the terminal pins 32, 33 and 34. The terminal pins carry a reduced diameter end portion which forms a metal-to-metal seat in the bottom of the threaded opening formed within the electrodes. Thus, the electrodes may be replaced one at a time or as a group upon the base 11 and threaded into position with the metal-to-metal stop being formed and protecting the resilient washers 37, 38 and 39 against excessive compression or mechanical destruction. Thus, the metal-to-metal abutment between the terminal pins and electrodes, and the precise space thereby provided, create the desired sealing function for the insulating fluid seals which encircle the terminal pins.

The electrodes may be formed of any suitable conductive material. Preferably the electrodes are fabricated from 10–20 mild steel. However, materials such as iron, aluminum, copper, brass, lead, nickel, titanium, tantalum, zirconium, chromium, and alloys thereof, may be used under similar conditions.

Various modifications and alterations in the described probe assembly will be apparent to those skilled in the art from the foregoing description which do not depart from the spirit of the invention. For this reason, these changes in structure are desired to be included within the scope of the present invention. The appended claims define the present invention; the foregoing description is to be employed for setting forth the present embodiments as illustrative in nature.

What is claimed is:

1. A corrosion test probe assembly suitable for determining the rate of corrosion of a metallic material in a corrodant by means of polarization measurements comprising:

(a) a metallic body provided in a bottom portion with an axial passageway having a cylindrical sidewall and said body carrying an abutment shoulder adjacent said passageway;

(b) a rigid insulator member having a cylindrical exterior surface and said member is slideably positioned in said passageway in engagement with said abutment shoulder whereby axial movement of said member into said body is restrained;

(c) said member carrying a circumferential groove mounting an annular resilient seal, and said resilient seal placed into initial sealing engagement when said insulator member is positioned in said body whereby said resilient seal joins said member and body into a fluid tight relationship;

(d) a plurality of metallic electrical conductors integrally carried in said member in electrical isolation and extending axially from both ends thereof, one exposed end of each said conductors forming a terminal pin to receive a metallic electrode, and the other exposed end of each of said conductors electrically connected by flexible electrical leads to an external circuit connector positioned at the top portion of said body and said leads are contained in a cavity formed in said body between said connector and said member;

(e) a plurality of metallic electrodes secured to said terminal pins;

(f) locking means for releasably securing said member within said body;

(g) insulating fluid seals encircling said terminal pins and engaged axially in fluid tightness between presented sealing surfaces associated with said member and said electrodes; and (h) said circuit connector providing testing circuits with said conductors through said electrodes during polarization measurements.

2. The probe assembly of claim 1 wherein said body is provided with the top portion having a polygonal configuration and the bottom portion having a threaded exterior side surface, said body having formed therein said cylindrical passageway extending from said bottom portion axially to said abutting shoulder residing adjacent the top portion of said body, and said electrical connector extending axially from said top portion of said body.

3. The probe assembly of claim 2 wherein said locking means are provided by a plurality of screws extending from said electrical connector through said body into threaded interconnection with said member.

4. The probe assembly of claim 1 wherein the exposed ends of said conductors carry axial openings to receive coaxially the ends of said flexible electrical leads, and said conductors and leads are electrically connected by crimping said exposed ends of said conductors to engage mechanically the ends of said leads.

5. The probe assembly of claim 4 wherein said flexible leads have a length sufficient to permit interconnection of said conductors with said member removed from said body.

6. The probe assembly of claim 1 wherein the resilient annular seal is provided by an O-ring.

7. The probe assembly of claim 1 wherein the rigid insulator member is formed of epoxy setting resins.

8. The probe assembly of claim 1 wherein the electrodes are dimensionally identical.

9. The probe assembly of claim 1 wherein said member integrally carries cylindrical raised parts to provide an axial sealing surface encircling a portion of said terminal pins on said conductors.

10. The probe assembly of claim 1 wherein said flexible electrical leads are electrically connected to the exposed ends of said conductors by direct mechanical interconnection.

References Cited

UNITED STATES PATENTS

| | | | |
|---|---|---|---|
| 3,406,101 | 10/1968 | Kilpatrick | 204—1 T |
| 3,558,462 | 1/1971 | Wilson | 204—195 C |

GERALD L. KAPLAN, Primary Examiner

U.S. Cl. X.R.

324—71 R